United States Patent [19]

Gadkaree

[11] Patent Number: 5,487,917
[45] Date of Patent: Jan. 30, 1996

[54] CARBON COATED SUBSTRATES

[75] Inventor: Kishor P. Gadkaree, Big Flats, N.Y.

[73] Assignee: Corning Incorporated, Corning, N.Y.

[21] Appl. No.: 407,522

[22] Filed: Mar. 16, 1995

[51] Int. Cl.$^6$ ..................................................... B05D 3/02
[52] U.S. Cl. .......................... 427/228; 427/243; 427/244; 427/362; 427/379; 427/385.5; 427/388.2
[58] Field of Search ................................. 427/228, 302, 427/385.5, 379, 388.2, 243, 244

[56] References Cited

U.S. PATENT DOCUMENTS

| | | | |
|---|---|---|---|
| 3,627,571 | 12/1971 | Cass | 427/302 |
| 3,801,351 | 4/1974 | Dauksys | 427/302 |
| 3,885,977 | 5/1975 | Lachman et al. | 106/62 |
| 4,054,705 | 10/1977 | Vassiliou | 427/228 |
| 4,100,322 | 7/1978 | Scibold et al. | 427/302 |
| 4,127,691 | 11/1978 | Frost | 428/116 |
| 4,758,272 | 7/1988 | Pierotti et al. | 75/246 |
| 4,992,233 | 2/1991 | Swaroop et al. | |

FOREIGN PATENT DOCUMENTS

| | | |
|---|---|---|
| 0488716A1 | 6/1992 | European Pat. Off. . |
| 0608539A1 | 8/1994 | European Pat. Off. . |

*Primary Examiner*—Janyce A. Bell
*Attorney, Agent, or Firm*—L. Rita Quatrini

[57] ABSTRACT

A method of producing activated carbon supported on a substrate involves impregnating a substrate with a crosslinking resin curing catalyst, followed by impregnating the substrate with a crosslinking thermosetting resin, curing the resin, carbonizing the resin, and activating the carbon.

8 Claims, No Drawings

CARBON COATED SUBSTRATES

This invention relates to a method of producing carbon coated substrates in which the carbon is derived from a crosslinkable resin. A crosslinkable resin curing catalyst is first coated on the substrate and thereafter the resin is coated on the substrate over the catalyst.

BACKGROUND OF THE INVENTION

Activated carbon is a nongraphitic microcrystalline form of carbon which has been processed to produce a carbon with high porosity. Activated carbon is used widely in applications involving removal of impurities from liquids and gases. Activated carbon has particular utility in adsorbing and purifying fluid emissions from internal combustion engines.

Conventionally activated carbon is used in powdered or granular form. Powdered or granular activated carbon is inconvenient to use in processes where continuous flow of fluids are filtered and/or treated. To solve this problem, attempts have been made to use activated carbon in the form of, or in conjunction with a solid substrate.

For example, attempts have been made to manufacture monolithic bodies consisting essentially of activated carbon, or to extrude carbonaceous material into a shaped body, and then convert the shaped body to activated carbon. In such processes, a binder is typically added to activated carbon powder and the mixture is shaped by extrusion. One disadvantage of these bodies is that the binder blocks the pores of the activated carbon and therefore the adsorption capacity of the body is diminished. If the amount of binder is reduced to minimize blocking, the strength of the body is compromised. Furthermore, most substances useful as extrusion binders begin to deteriorate at temperatures above 150° C. further diminishing their applicability. Also components of a workstream, and even water often react with binder.

More recently, activated carbon has been produced as a coating on a substrate, typically a honeycomb as described in EPO application publication no. 608,539 A1. According to this process, a carbon precursor liquid, commonly a thermosetting resin, is coated onto a substrate, and thereafter, the carbon precursor is cured, carbonized, after which the carbon can be activated. The resulting product is an interpenetrating network structure of substrate and carbon. The product is useful in many industrial and automotive applications.

In the above process, one very important requirement of the resin is that it should be of sufficiently low viscosity to impregnate the substrate structure. The resin viscosity has a strong effect on the amount of resin picked up by the substrate, which in turn determines the amount of carbon in the structure and hence its adsorption capacity. To make a consistent product it is necessary to maintain resin viscosity at a consistent level. If the resin has a long shelf life with a latent catalyst, then the viscosity can be maintained constant over a desired period of time. In case of some of the resins, maintaining viscosity at a constant level is not possible. Furan resins, for example, are very desirable thermoset resins for fabrication of carbon-ceramic honeycomb structures because of their high carbon content, high crosslinking density, and ease of cure. If these resins are thermally cured and carbonized without a catalyst, the carbon yields are low. The carbon yields can be increased by adding a catalyst and consolidating the resin before carbonization. The catalyst addition, however, results in continuous increase in viscosity which causes two problems. First the shelf life of the resin is very limited and second, the amount of resin pick up on the honeycomb continuously varies as a function of time thus making it impossible to make a consistent product.

The present invention provides a method which solves this problem.

SUMMARY OF THE INVENTION

In accordance with one aspect of the invention, there is provided a method of producing activated carbon supported on a substrate involves impregnating a substrate with a crosslinking resin curing catalyst, followed by impregnating the substrate with a crosslinking thermosetting resin, curing the resin, carbonizing the resin, and activating the carbon.

DETAILED DESCRIPTION OF THE INVENTION

The present invention relates to a method for making activated carbon supported on a substrate which consistently results in high carbon yield.

In this process the substrate is impregnated with the catalyst first, and thereafter with the resin, rather than the current practice of mixing the catalyst and resin and applying both at once to the substrate.

Any high carbon yield resin can be used. By high carbon yield is meant that greater than about 10% of the starting weight of the resin is converted to carbon on carbonization. Phenolic and furan resins are the most suitable with furan resin being preferred. One especially suitable furan liquid resin is Furcarb-LP from QO Chemicals Inc. Another suitable resin is phenolic resole resin such as 43250 plyophen resin from Occidental Chemical Corp.

The curing catalysts can be any of those known in the art. Some typical curing catalysts are ammonium chloride, ammonium nitrate, zinc chloride, citric acid, and paratoluene sulphonic acid (PTSA) or combinations of these. The preferred catalysts are zinc chloride and PTSA because they have been found to result in the highest amount of activated carbon in the structure when all other factors are constant.

The substrate of the present invention can be made from any metal or non-electrically conducting inorganic material, and made by known process.

The only requirements are that the substrate have enough strength to function in the application, and have pores extending from its outer surface and be capable of withstanding the heat-treating temperatures encountered in forming the activated carboil coating. For example, in the case of particulate carbon-binder coatings, the substrate must have sufficient strength to withstand heat-treating temperatures. In the case of carbon precursors, the substrate must have strength to withstand carbonizing and activating temperatures.

The overall open porosity of the substrate can vary from very low e.g., 0.1% to higher. Generally, it is desirable that the overall open porosity be at least about 10%, preferably greater than about 25% and most preferably greater than about 40%. For most purposes, the desirable range of porosity is about 45% to about 55%. Preferably the pores of the substrate material create "interconnecting porosity" which is characterized by pores which connect into and/or intersect other pores to create a tortuous network of porosity within the substrate.

Suitable porous substrate materials include ceramic, glass ceramic, glass, metal, and combinations thereof. By combinations is meant physical or chemical combinations, eg., mixtures, compounds, or composites.

Some materials that are especially suited to the practice of the present invention, although it is to be understood that the invention is not limited to such, are those made of cordierire, mullite, clay, talc, zircon, zirconia, zirconates, zirconia-spinel, zeolites, magnesium alumino-silicates, spinel, alumina, silica, silicates, borides, alumino-silicates, eg., porcelains, lithium aluminosilicates, alumina silica, feldspar, titania, fused silica, nitrides, borides, carbides, eg., silicon carbide, silicon nitride or mixtures of these. Cordierire is preferred because its coefficient of thermal expansion is comparable to that of carbon, increasing the stability of the activated carbon body. Some typical ceramic substrates are disclosed in U.S. Pat. Nos. 4,127,691 and 3,885,977. Those patents are herein incorporated by reference as filed.

The invention is suitable for use with metal substrates. The substrates can be made of any sinterable metal or metal composition. Especially suited are iron group metal, chromium, and aluminum compositions, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders are disclosed in U.S. Pat. Nos. 4,992,233, 4,758,272, and European patent application publication no. 488716A1, which are herein incorporated by reference as filed. U.S. Pat. No. 4,992,233 relates to methods of producing porous sintered bodies made from metal powder compositions of Fe and Al with optional additions of Sn, Cu, and Cr. European patent application publication no. 488716A1 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as eg., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

In general the metal and/or metal alloy powders and optionally rare earth oxide powders are mixed in amounts to result in the body having the desired composition. The starting metal powders are iron, cobalt, nickel, chromium, aluminum metals, and special metal powders, if they are to be used. The metal can be supplied in either the unalloyed form or alloyed with one or more of the other metals, or partially unalloyed and partially alloyed. Most typically, however, the iron, when added as the balance, is in the elemental form. The chromium can be elemental or alloyed with aluminum or iron. Chromium-aluminum alloy is preferable. Typically, the aluminum is supplied alloyed with iron and/or chromium for stability. Some typical alloy powders that can be used in formulating the mix to yield a body having some typical compositions of the present invention are Fe-Cr-Al- (Y, lanthanide series elements, Zr, Hf, or Cu) alloy powder, Cr-Al-(Y, lanthanide series elements, Zr, Hf, or Cu) alloy powder, Fe-B, Fe-Si powder, etc.

The substrate can take any known form including eg., tubes, foams, multicellular bodies or honeycombs. Typically, the substrate has open-ended channels for passage of a workstream in and out of the body. The substrate is preferably a honeycomb having a matrix of thin walls which form a multiplicity of open-ended cells extending between the ends of the honeycomb.

Some examples of honeycombs produced by the process of the present invention, although it is to be understood that the invention is not limited to these, are those having about 172 cells/cm$^2$ (1100 cells/in$^2$), about 94 cells/cm$^2$ (600 cells/in$^2$), about 62 cells/cm$^2$ (400 cells/in$^2$), or about 47 cells/cm$^2$ (300 cells/in$^2$), those having about 31 cells/cm$^2$ (200 cells/in$^2$), or about 15 cells/cm$^2$ (100 cells/in$^2$), or about 2.5 cells/cm$^2$, (16 cells/in$^2$) or about 1.5 cells/cm$^2$ (9 cells/in$^2$).

Wall (web) thicknesses range typically from about 0.1 to about 1.3 mm (about 4 to about 50 mils) for most applications and it is to be understood that the invention is not limited to these dimensions. The external size and shape of the body is controlled by the application and is not limited to those described above. For example, other combinations of cell densities and wall thicknesses can be made.

The respective coatings are applied to the surfaces of the substrate. This means that all the open surfaces, including the porosity of the substrate are coated. In other words, the coating is impregnated into the substrate. For example, for honeycombs, the coating is present on the outer surfaces as well as the on the webs or walls.

One illustration of the advantages of applying the catalyst and resin separately is seen in Table 1 below. The table shows the variation in viscosity of furan liquid resin QO Chemicals Co. Furcarb-LP liquid furan resin with time. As can be seen, depending on the catalyst and the amount of elapsed time, the viscosity of the resin can vary widely. The continuous viscosity change with time makes it difficult to coat honeycomb substrates with consistent results. Therefore, having the catalyst and resin separated, ensures that the coating procedure will be consistent from one substrate to another since the viscosity of the resin remains constant.

TABLE 1

| Catalyst | % in Resin | Time Hr. | Viscosity cps |
| --- | --- | --- | --- |
| ZnCl2 | 10% | 20 | 225340 |
| Citric Acid | 10% | 20 | 190390 |
| PTSA | 0.1% | 20 | 210 |
| para-toulene-sulphonic-acid | | | 2500 |

The coatings of catalyst and resin can be applied by techniques known in the art such as for example, immersing the substrate in the coating media. The substrate can be dipped more than once to ensure sufficient loading of the coating material.

The curing catalyst in the form of a solution, most typically an aqueous solution, is first coated onto the surfaces of the substrate.

The catalyst-coated substrates are then dried to remove the liquid. This is usually done in air at about room temperature to about 100° C., usually about 80° C. if the catalyst solvent is water. Drying temperature depends on the boiling point of the solvent.

The catalyst coated honeycomb is then coated or impregnated with the resin. The resin is a liquid resin and is used as is (neat). Since the resin does not have the catalyst intimately mixed with it, the viscosity and impregnation behavior of the resin does not change. The shelf life of the resin remains long and processing and product consistency are not affected.

Coating of honeycomb substrates with resin presents certain problems. For example, as the honeycomb is dipped into the resin, all the cells of the honeycomb fill up with liquid resin. For a fast production process, this excess liquid must be removed quickly. Although most of the liquid resin flows out of the cells under gravity, depending on the cell size and capillary forces involved, a substantial amount of resin is maintained in the cells. Commonly one of two methods can be employed to remove the excess liquid from the cells. The resin can be easily blown out of the cells by using an air blower. This however, can result in removal of excess amounts of resin if the air pressure is not properly controlled. Since it is necessary to maintain as much resin as possible on the honeycomb to obtain high carbon weight percent, this method is not the preferred method. Applying vacuum also results in quick removal of excessive amounts of resin.

One technique for applying the resin is to dip the honeycomb (or any shape substrate) into the resin and then allow the excess resin to drip off the substrate into a container. The resin that is still retained in the honeycomb cells is then removed by setting the resin-soaked honeycomb on an absorbent paper. This method allows the resin to be removed very slowly. The paper has to be changed several times and the resin cannot be recovered. The entire process for a 15 cm (6") long, 62 cells/cm$^2$ (400 cells/in$^2$) honeycomb takes about 8 hours. If another coat is applied, the process will take an additional 8 hours.

In accordance with a preferred embodiment, the honeycomb is dipped into the resin followed by allowing the excess resin to drain from the honeycomb by capillary action onto a thin honeycomb cross-section (cookie) which has cells of the same or smaller dimensions as the coated honeycomb. If the coated honeycomb is placed in intimate contact with the cookie, that is, if both honeycomb and cookie surfaces are flat and parallel, the resin drains through the honeycomb. The resin head, due to capillary action is held in the cookie of appropriate thickness. The honeycomb thus drains quickly and without plugs in any of the cells. The cookie can be reused. This process takes less than about 5 minutes per coat as compared with the 8 hours by the previous method for a honeycomb of the same size. The amount of resin obtained on the honeycomb in one coat is more than the amount of resin obtained with two coats of the previous process. Essentially all of the excess resin can be recovered for reuse by being collected in an appropriate size vessel. Another very important advantage is that the honeycombs obtained do not contain any plugged cells, thus improving the quality of the product. This technique can be adapted to small or larger size operations.

The coated bodies are then dried. Drying can be done in air at room temperature –80° C., or in dielectric or microwave dryers.

The dried bodies are then cured in the shaped form by heating under the specific temperature and time conditions required for the specific resin. The catalyst initiates the curing reaction at the appropriate temperature. The curing can be done at room temperature or in a conventional oven. Standard curing conditions can be found in the manufacturer's literature. Furan can be cured with the appropriate amount of catalyst at room temperature. The curing can be speeded up by heating to about 100° C. to 125° C. With furan resin the preferred conditions are heating to about 100° C. for about 1 to 2 hours. Curing can also be done in a microwave or dielectric oven for non-conducting materials.

The cured resin is then carbonized. The carbonization is carried out by heating the body in an inert or reducing atmosphere such as nitrogen or argon or forming gas. Forming gas is a mixture of nitrogen and hydrogen. Typical mixtures by volume are 92:8 or 94:6 $N_2$:$H_2$, although any mixtures can be used. Carbonization temperatures are about 600°C.–1000° C. or more typically about 700°–1000° C. for a length of time of usually about 1–20 hours. While the body is in the temperature range of about 300°–600° C., the fugitive materials vaporize. During carbonization low molecular weight compounds separate out and carbon atoms form graphitic structures. For Furan Furcarb resin from QO Chemicals, carbonization is done by heating at a rate of about 150° C./hr in N. The temperature is held at about 900° C. for about 6–10 hours to complete the carbonization. The temperature is then reduced to 25° C. at a cooling rate of about 150° C./hr. On carbonization, the body contains random three dimensional oriented graphitic platelets with amorphous carbon between the platelets.

The carbon is then activated. This is done by partially oxidizing in a suitable oxidant such as $CO_2$, steam, air, or a combination of these, etc. Activation can be carried out at temperatures between about 700° C.–1000° C. Activation conditions depend on type and amount of resin, flow rate of gas, etc. For example for Furcab resins activation conditions are at about 900° C. for about 1 hour in $CO_2$ at a flow rate of about 14.2 l/hr. (about 0.5 CFH (ft.$^3$/hr.)). The partial oxidation during activation causes the removal of the amorphous carbon and the formation of molecular size porosity between the graphitic platelets. This porosity and the graphitic platelets impart the adsorption characteristics to the resulting activated carbon body. Such activated carbon bodies are used in adsorption applications.

To more fully illustrate the invention, the following non-limiting examples are presented. All parts, portions, and percentages are on a weight basis unless otherwise stated.

Butane adsorption capacity was measured on the inventive examples. Butane adsorption capacity was measured by placing test samples in a Vycor® tube housed inside a tube furnace having inlet and outlet ports. A 1500 volume ppm butane gas stream in a nitrogen carrier gas was introduced to the sample at a flow rate of about 4,000 cc/min. and adsorption was measured by monitoring the exit gas stream with a flame ionization detector. Adsorption at room temperature was considered complete when the calibrated detector reading had reached about 95%. The detector readings were plotted versus time and the adsorption was measured by integrating the area under each curve. The values reported for adsorption are the total milligrams of butane adsorbed for a 2.54 cm (1") diameter, 2.54 cm (1") long sample.

EXAMPLE 1 (INVENTIVE)

Several different catalysts were impregnated on honeycombs via aqueous solutions. The catalysts were first dissolved in deionized water. Cordierite honeycombs measuring 2.54 cm long and 2.54 cm in diameter (1"×1") with about 31 cells/cm$^2$ (about 200 cells/in.$^2$), and having about 47% open porosity were dipped in the solutions, removed, and dried at about 80° C. to remove the water. The dried honeycombs were then dipped in a Furcarb-LP liquid resin bath and coated with the resin. The excess resin was removed. The resin on the honeycombs was cured at about 100° C. for about 2 hours. The resin coated honeycombs were then carbonized by heating in nitrogen to about 900° C. for about 6 hours and then activated by heating in $CO_2$ for about 2 hours at about 900° C. Butane adsorption capacities were measured on these honeycombs, The results are summarized in Table 2. As can be seen, the effectiveness of different catalyst varies significantly, Zinc chloride and PTSA are the best catalysts and result in the highest amount of activated carbon in the structure, The measured butane adsorption capacity is directly dependent on the amount of carbon present in the structure.

TABLE 2

| Catalyst (% in water) | % Resin cured on honeycomb | % Carbon after activation | Butane Capacity mg |
| --- | --- | --- | --- |
| 10% NH4Cl | 26.4 | 8.9 | 82 |
| 10% NH4(NO3) | 29.6 | 11.7 | 109 |
| 10% ZnCl2 | 32.7 | 17.3 | 179 |
| 10% Citric Acid | 27.7 | 10.2 | 98 |
| 10% PTSA | 37.0 | 18.6 | 179 |

The following example illustrates the preferred coating technique used in the practice of this invention.

EXAMPLE 2

Experiments were carried out with large (about 14 cm long×7 cm diameter) (5.5" long×2.75" diameter)) honeycombs having about 62 cells/cm$^2$ (about 400 cells/in.$^2$) and about 0.15 mm (about 6 mil) wall thickness. The honeycombs had about 48% open porosity. The experiments were done with a phenolic resole resin (43250 plyophen resin from Occidental Chemical Corp.) with a viscosity of about 100 cps. The honeycombs were dipped, drained, and cured completely to measure the amount of resin picked up by the honeycomb. The coating was done either by (1) dipping in resin and allowing the excess resin to be absorbed on a paper towel or (2) dipping in resin, setting the coated substrate on a honeycomb cookie of similar cell density positioned over a collection vessel to collect excess resin. The weight percent pick up was calculated on the basis of final weight of the coated honeycomb. Some experiments were done where the honeycomb coated once was coated a second time, drained, and cured to increase the amount of resin impregnated into the honeycomb. Table 3 below shows the results of these tests.

TABLE 3

| No. | No. of Coats of Resin | Weight % Resin Pick Up | Type of Drainage | Time |
| --- | --- | --- | --- | --- |
| 1 | One | 33.16 | Honeycomb Cookie | 3 minutes |
| 2 | Two | 32.2 | Paper Towel | 16 hours |
| 3 | Two | 40.37 | Honeycomb cookie | 6 minutes |

As Table 3 shows, the time to coat the honeycomb was reduced dramatically from 16 hours to about 5 minutes. The amount of resin impregnated into the honeycomb which in turn determines the carbon content and hence the performance of the honeycomb is substantially increased from about 32% to about 40%. This method allows complete recycling of the resin and eliminates waste.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of producing activated carbon supported on a substrate, the method comprising:
   a) impregnating a porous substrate with a crosslinking resin curing catalyst;
   b) impregnating the catalyst impregnated substrate from step a with a crosslinking thermosetting resin;
   c) curing the resin;
   d) carbonizing the resin; and
   e) activating the carbon by heating the carbon impregnated substrate from step d under oxidizing conditions to remove amorphous carbon and produce molecular size porosity in the carbon thereby producing an activated carbon impregnated substrate.

2. A method of claim 1 wherein the curing catalyst is selected from the group consisting of zinc chloride, ammonium chloride, ammonium nitrate, paratoluene sulfonic acid, and combinations thereof.

3. A method of claim 2 wherein the catalyst is selected from the group consisting of zinc chloride and paratoluene sulfonic acid.

4. A method of claim 1 wherein the substrate is made of material selected from the group consisting of ceramic, glass, glass-ceramic, metal, and combinations thereof.

5. A method of claim 4 wherein the substrate is made of material selected from the group consisting of cordierite, and alloy consisting essentially of iron group metal and aluminum.

6. A method of claim 4 wherein the substrate is made of an alloy consisting essentially of Fe, Cr, and Al.

7. A method of claim 1 wherein the resin is furan resin.

8. A method of claim 1 wherein the substrate is a honeycomb structure.

\* \* \* \* \*